Oct. 13, 1925.
J. W. BLANKENSHIP
PLOWPOINT
Filed Jan. 10, 1923
1,557,408
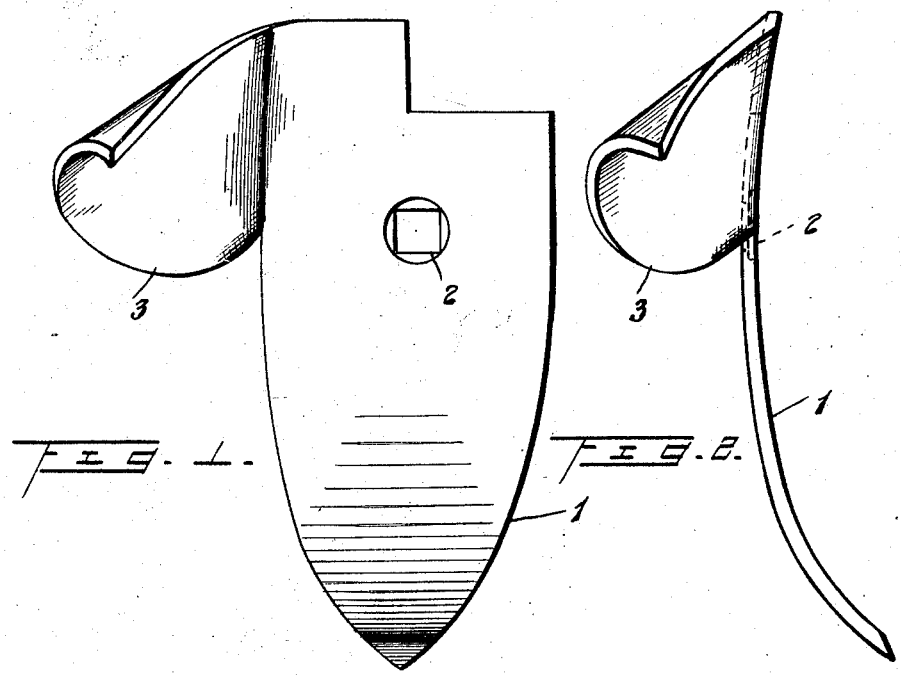
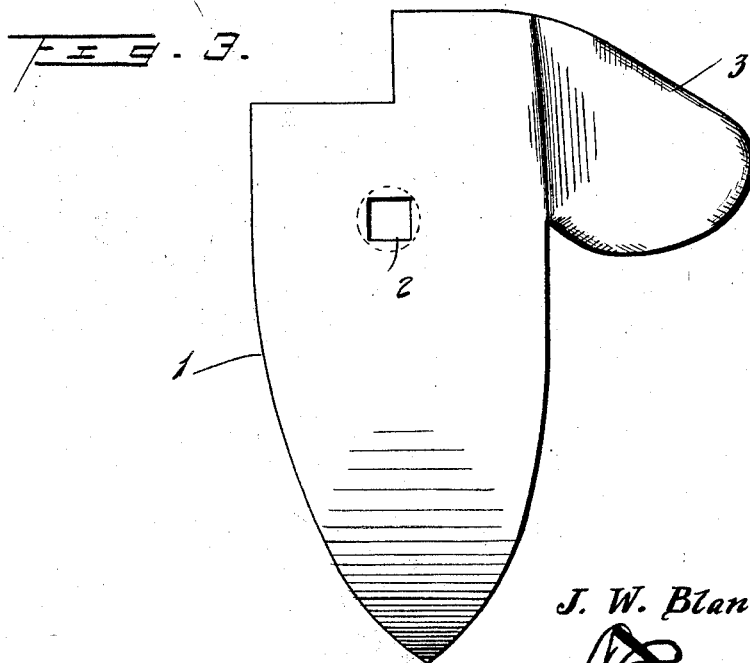
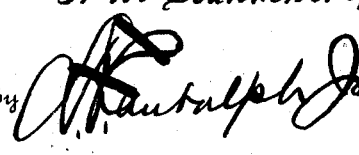

Patented Oct. 13, 1925.

1,557,408

UNITED STATES PATENT OFFICE.

JEHU W. BLANKENSHIP, OF LYNCHBURG, VIRGINIA.

PLOWPOINT.

Application filed January 10, 1923. Serial No. 685,486.

*To all whom it may concern:*

Be it known that I, JEHU W. BLANKENSHIP, a citizen of the United States, residing at Lynchburg, in the county of Campbell and State of Virginia, have invented certain new and useful Improvements in Plowpoints; and I do hereby declare the following to be a full, clear, and exact description of the invention, such as will enable others skilled in the art to which it appertains to make and use the same.

The present invention has for its object to obviate the necessity of going over the field with a hoe after plowing to throw the earth about the roots of the plants, thereby saving labor and enabling a field to be cultivated in much less time than is possible by the old method of plowing and subsequently hoeing.

In accordance with the invention, the plow point is provided with a laterally disposed wing which is rearwardly deflected thereby admitting of the plants being cultivated and the earth thrown about the roots thereof at one operation.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view of a plow point embodying the invention,

Figure 2 is a side view thereof, and

Figure 3 is a rear view.

Corresponding and like parts are referred to in the following description and designated in the several views of the drawings by like reference characters.

The numeral 1 designates the plow point which may be of any usual and preferred construction, the same being provided with an opening 2 for reception of the heel bolt by means of which the plow point is attached to the plow stock or standard. In accordance with the invention a wing 3 is provided adjacent the upper end of the plow point and extends rearwardly and laterally and its upper edge portion curves forwardly whereby to gather the earth and throw the same towards the furrow so as to cover the roots of the plant. The front face of the wing 3 is concave and the earth discharging laterally from the upper portion of the plow point is thrown forwardly and inwardly so as to cover the roots of the plants and thereby obviate the necessity for subsequent hoeing to perform this office. The wing 3 may be provided in any manner and preferably constitutes a part of the plow point.

What is claimed is:

A plow point having a blade provided with a wing integral therewith and extending from an edge thereof, said wing being bent sharply rearwardly on a line forming a continuance of the line defining the corresponding edge of the blade and inclined laterally the upper edge of said wing having its outer portion curved forwardly, said wing forming a mold board that is adapted to direct the earth laterally of the furrow formed by the blade.

In testimony whereof I affix my signature.

JEHU W. BLANKENSHIP.